UNITED STATES PATENT OFFICE.

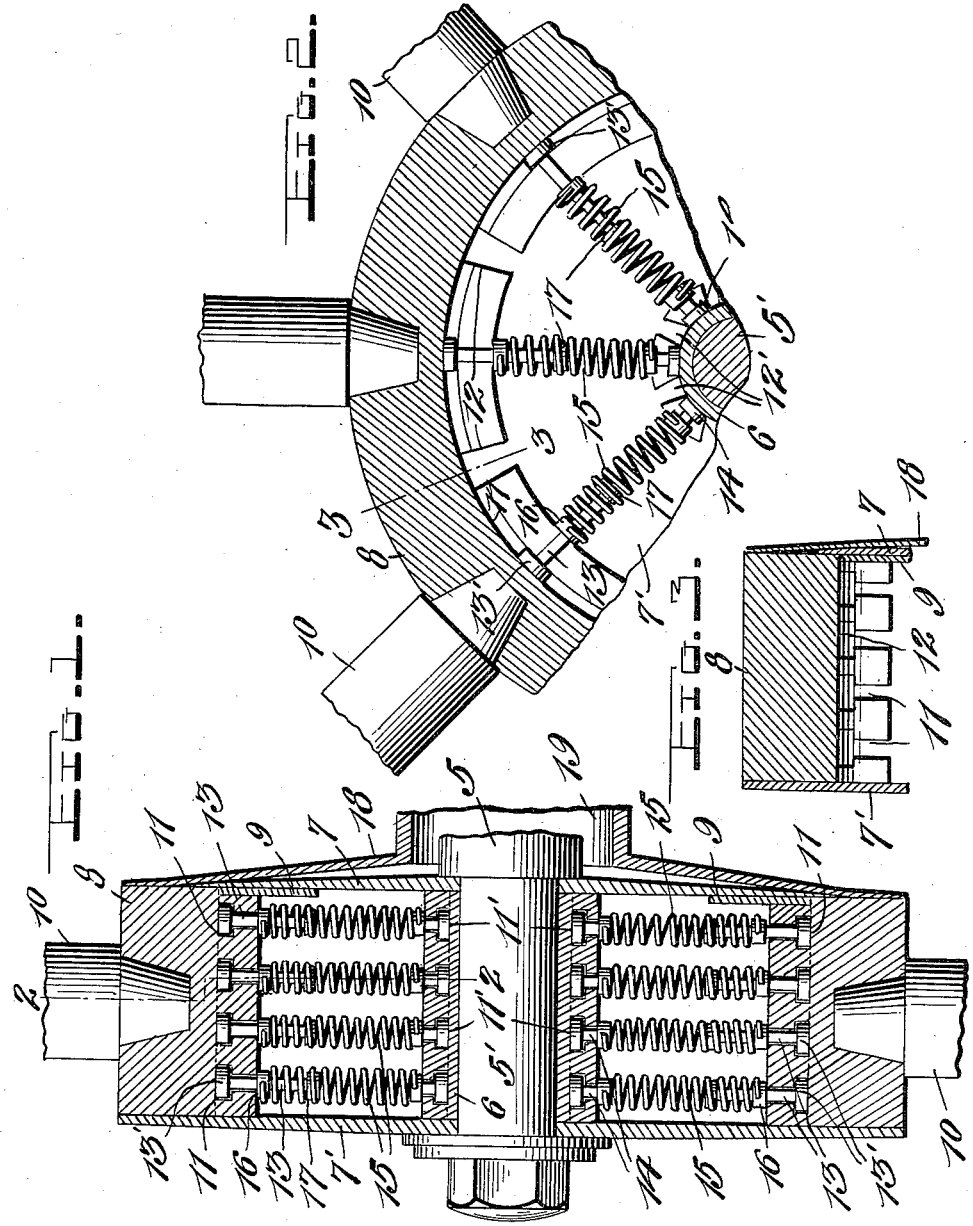

FREDERIC W. DAMITZ, OF PE ELL, WASHINGTON.

VEHICLE-WHEEL.

1,009,226.   Specification of Letters Patent.   Patented Nov. 21, 1911.

Application filed February 14, 1911. Serial No. 608,506.

*To all whom it may concern:*

Be it known that I, FREDERIC W. DAMITZ, a citizen of the United States, residing at Pe Ell, in the county of Lewis and State of Washington, have invented certain new and useful Improvements in Vehicle-Wheels, of which the following is a specification, reference being had to the accompanying drawings.

This invention relates to improvements in vehicle wheels and more particularly to a wheel of novel construction which is primarily designed for use upon automobiles and other motor driven vehicles.

The object of the present invention resides in the provision of a wheel of the above character having cushioning means arranged in the hub thereof whereby all shock or jar to the body of the vehicle is eliminated.

Another object of the invention is to provide a spring hub for vehicle wheels of exceedingly simple construction and one which is very durable and highly efficient in practical use.

With the above and other objects in view, the invention consists of the novel features of construction, combination and arrangement of parts hereinafter fully described and claimed, and illustrated in the accompanying drawing, in which—

Figure 1 is a vertical longitudinal section of a wheel hub embodying my improvements; Fig. 2 is a section of a fragment of the hub taken on the line 2—2 of Fig. 1, and Fig. 3 is a detail section on the line 3—3 of Fig. 2.

Referring in detail to the drawing, 5 designates the supporting axle which is arranged beneath and is mounted on the chassis or frame of the motor vehicle in any ordinary or approved manner. Upon the axle spindle 5', the inner hub sleeve 6 is arranged. Upon opposite ends of this sleeve inner and outer hub plates 7 and 7' respectively are secured. It will be observed from reference to Fig. 1 that the inner plate 7 is of less diameter than the outer plate 7'. The peripheral portions of these plates engage and move upon the opposite faces of the outer hub ring 8. An annular flange 9 is secured to the inner periphery of this ring at the inner end of the hub to provide sufficient bearing surface for the smaller plate 7 carried by the sleeve 6. A plurality of spokes 10 are fixed in the hub ring 8 in any preferred manner.

The inner face of the hub ring 8 is provided with a plurality of annular grooves 11. Transverse openings 12 are cut through the walls of these grooves to provide means for the easy and quick insertion of the pins 13 into the same. These pins have threaded on one end the heads 13' upon one of their ends whereby the same are retained in the annular grooves 11, said heads being inserted through the openings 12 in assembling the device. The inner hub sleeve 6 is also provided with a series of annular grooves 11' with which the openings 12' communicate. Headed pins 14 are arranged in said grooves and to these pins one of the ends of the springs 15 are connected. The other ends of said springs are secured to the washers 16 loosely disposed upon the pins 13. The outer ends of these pins have heads 17 formed thereon to prevent release of the washers 16. While any desired number of the springs 15 may be utilized in putting my invention into practical operation, I preferably arrange the same in series of four springs each, which are disposed in radial alinement with the spokes 10. These springs serve to absorb all shock or vibration which is occasioned by the vehicle moving over rough roads, so that such shock is not imparted to the vehicle body or to the operator.

It is obvious that the springs 15 may be of different tensile strength in accordance with the weight of the vehicle body and the load which is to be carried thereby.

In the normal operation of the vehicle when traveling over comparatively smooth surfaced roads, the body of the vehicle is yieldingly supported by the springs 15 and the periphery of the hub ring 8 is concentrically disposed with relation to the periphery of the inner circular plate 7. In this position, the washers 16 on the pins 13 which are disposed above the axle of the wheel are in engagement with the heads 17 on the ends of the pins 13 while the washers 16 on the lower series of pins 13 are engaged against the periphery of the hub sleeve 6. When the vehicle encounters an obstruction on the roadway the plates 7 and 7' move upon the opposite faces of the wheel and compress and extend on the springs 15 disposed at diametrically opposite points around the inner hub sleeve 6. In this manner all shock or jar is entirely assimilated by the springs 15 so that its effect upon the contents of the vehicle or the driver is obviated.

A circular plate 18 is rigidly secured at its periphery to the inner face of the hub ring 8 and has centrally formed thereon a sleeve 19 which is concentrically spaced from the periphery of the axle 5. To this sleeve, a sprocket wheel, (not shown) over which the drive chain passes is rigidly secured. The inner plate 7 is retained in position between the inner face of the circular plate 18 and the face of the hub ring 8, by means of the annular flange 9, said hub ring moving between the opposed faces of the plates 7 and 7'.

From the above description it will be seen that I have devised a cushion hub for motor vehicle wheels which is simple in construction and highly efficient and durable in practical use. All of the parts are arranged between the inner and outer hub plates, thus maintaining the neat appearance of the wheel as a whole. Should any of the springs 15 become broken, the outer plates 7' may be easily and quickly removed by removing the axle nut and the spring replaced by a new one. The cost of manufacturing the device is also comparatively small and by the use of the cushioning hub pneumatic tires may be dispensed with. Thus considerable expense which is caused by punctures of the wheel tires may be eliminated.

While I have shown and described the preferred construction and arrangement of the various parts, it will be understood that the device is susceptible of considerable modification without departing from the essential feature or sacrificing any of the advantages thereof.

Having thus described the invention what is claimed is:

The combination with a vehicle axle, of an inner hub sleeve arranged upon said axle, inner and outer circular plates arranged upon the opposite ends of said sleeve, said inner plate being of less diameter than the outer plate, an outer hub ring radially movable between the opposed faces of said plates, a circular plate rigidly secured at its periphery to said ring and having a sleeve arranged in spaced relation to the vehicle axle, said inner plate being movable between said circular plate and said ring, said sleeve and outer ring each having a plurality of annular grooves in their opposed surfaces and transverse openings communicating with said grooves, a plurality of pins having heads upon one of their ends disposed in said grooves and movable through said transverse openings to insert or remove the same, and cushioning springs connected at their ends to the pins in said sleeve and ring.

In testimony whereof I hereunto affix my signature in the presence of two witnesses.

FREDERIC W. DAMITZ.

Witnesses:
L. S. WATSON,
PERRY M. WATSON.

---

Copies of this patent may be obtained for five cents each, by addressing the "Commissioner of Patents. Washington, D. C."